INVENTOR.
REGINALD B. BLAND

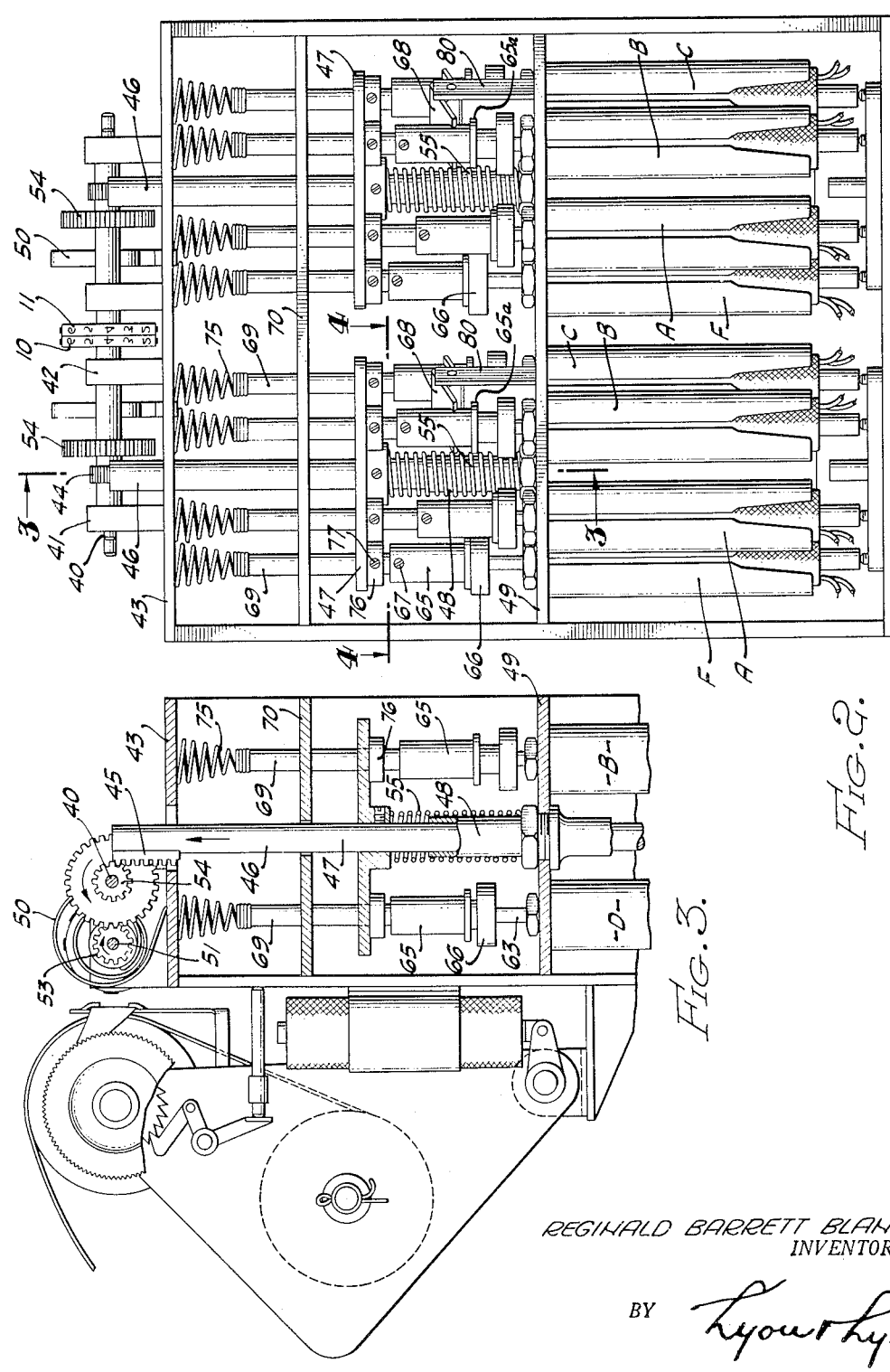

Sept. 27, 1955  R. B. BLAND  2,719,290
REMOTE INDICATING AND CONTROL DEVICES
Filed Sept. 4, 1951  5 Sheets-Sheet 3

REGINALD BARRETT BLAND,
INVENTOR.

BY Lyon+Lyon
ATTORNEYS

Sept. 27, 1955  R. B. BLAND  2,719,290
REMOTE INDICATING AND CONTROL DEVICES
Filed Sept. 4, 1951  5 Sheets-Sheet 4

REGINALD BARRETT BLAND,
INVENTOR.
BY Lyon & Lyon
ATTORNEYS

Sept. 27, 1955 R. B. BLAND 2,719,290
REMOTE INDICATING AND CONTROL DEVICES
Filed Sept. 4, 1951 5 Sheets-Sheet 5

REGINALD BARRETT BLAND,
INVENTOR.

BY Lyon+Lyon
ATTORNEYS

United States Patent Office 2,719,290
Patented Sept. 27, 1955

2,719,290

REMOTE INDICATING AND CONTROL DEVICES

Reginald B. Bland, Los Angeles, Calif.

Application September 4, 1951, Serial No. 244,875

9 Claims. (Cl. 340—324)

The present invention relates to improved means useful in various systems wherein it is desired to represent, either locally or remotely, the position of an element moved either manually or automatically.

As will be gleaned from the following description, the present invention has universal applicability in systems wherein it is desired to transfer indications to a remote location.

The present invention contemplates the provision of improved means whereby, for example, the angular position of a shaft may be indicated either locally or remotely in terms of numbers, the numbers being used either for indication purposes or for printing, as desired.

It is therefore an object of the present invention to provide improved means and techniques whereby the above indicated results are obtained.

A specific object of the present invention is to provide improved follow-up system in which the position of a remotely controlled element is truly representative of the position of a manually actuated member without the possibility of loss of synchronism between such element and member as is possible in systems incorporating Selsyn drives.

Another specific object of the present invention is to provide improved follow-up system of this character in which the position of a controlled element always bears a predetermined relationship with respect to a manually operable control member even though there may be a failure in the power supplying the system.

Another specific object of the present invention is to provide an improved apparatus of this character in which a record of indicator readings is obtained in the form of printed numerals, either locally or remotely.

Another specific object of the present invention is to provide improved system of the character described in the next preceding paragraph in which an operator may obtain a printed record of indications.

A further specific object of the present invention is to provide improved system of the character mentioned above, characterized by its simplicity and inexpensiveness.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2 is a view in side elevation of solenoid actuated mechanisms illustrated as solenoid coils in Figure 1.

Figure 4:
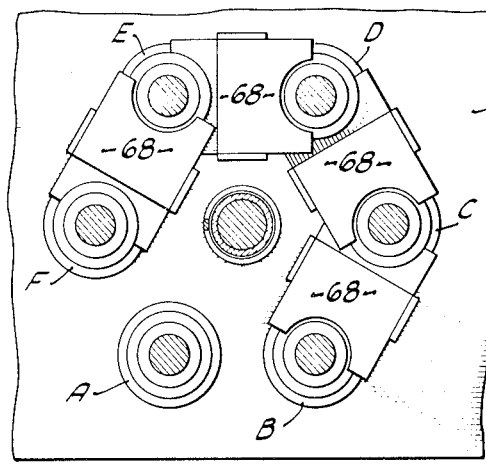

Figures 3 and 4 are views taken, respectively, on corresponding lines 3—3 and 4—4 in Figure 2.

Figure 5:
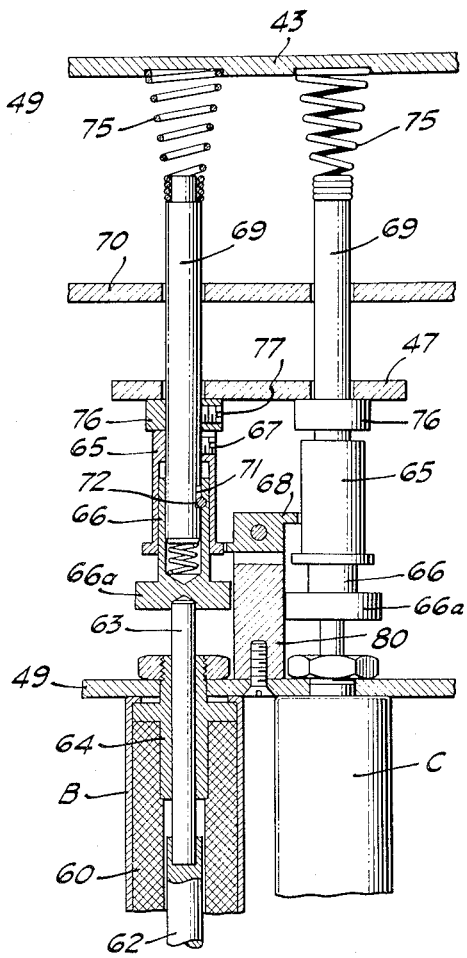

Figure 5 is a view showing in enlarged form a portion of the apparatus illustrated in Figure 2 with certain parts sectioned for purposes of illustrating internal structure.

Figure 6:
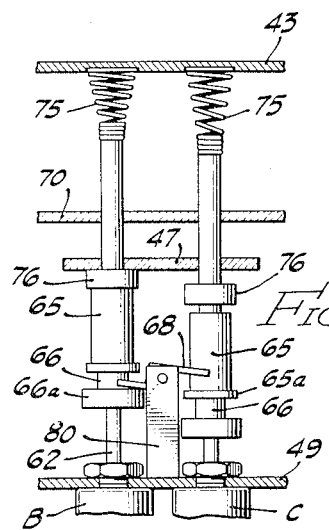
Figure 7:
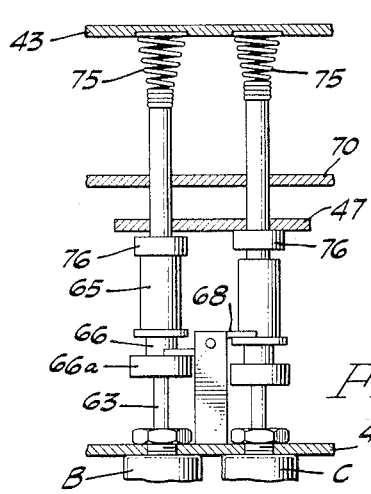

Figures 6 and 7 show parts of the structure illustrated in Figure 2 and serves to indicate the manner in which certain adjacent solenoid actuated mechanisms are interlocked.

Figure 1:
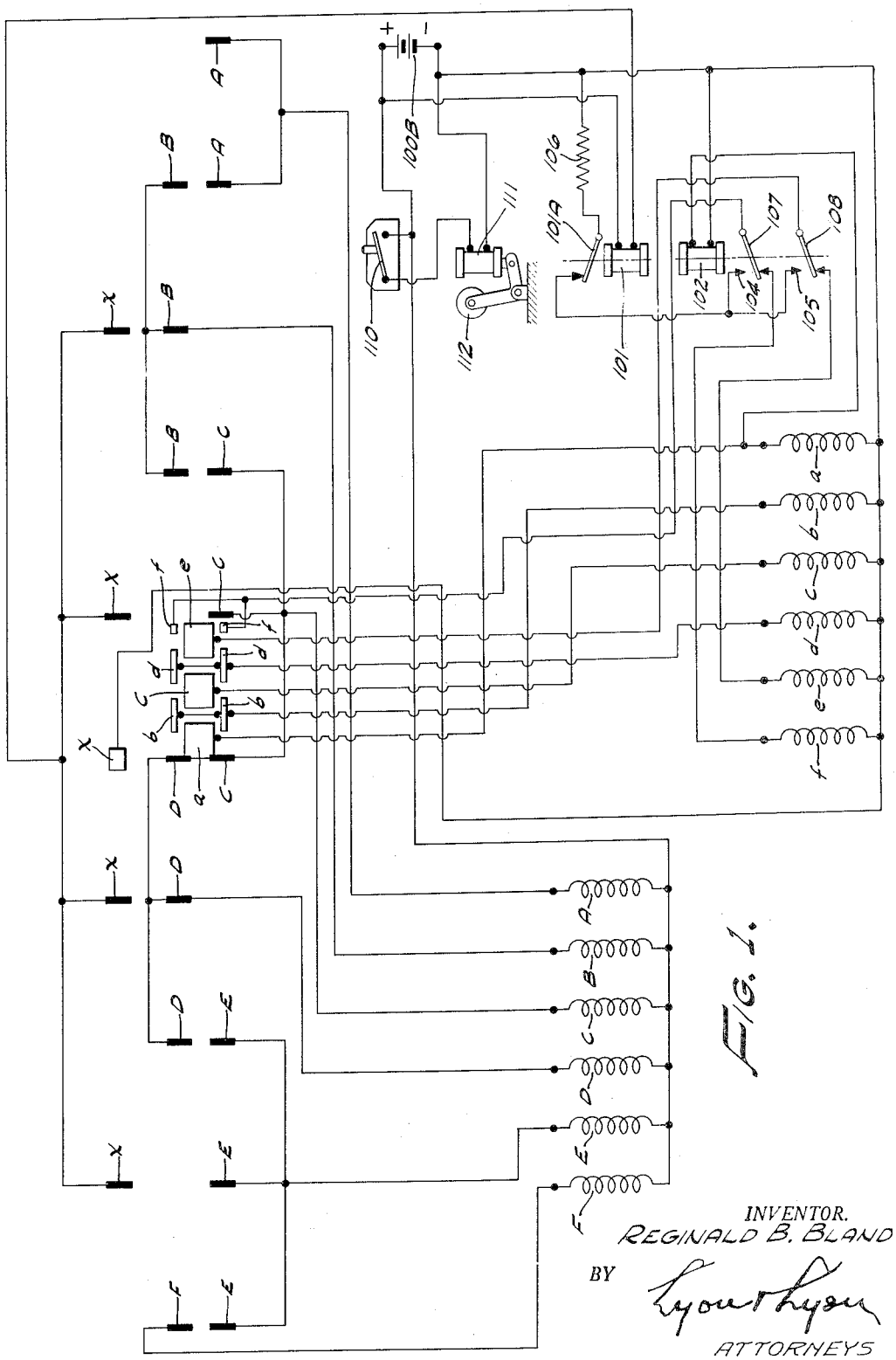
Figure 1 is a schematic representation of apparatus embodying features of the present invention.
Figure 8:
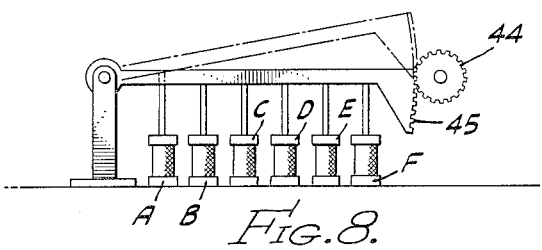

Figure 8 illustrates a modified solenoid actuated mechanism for use in the system illustrated generally in Figure 1.

Figure 9:
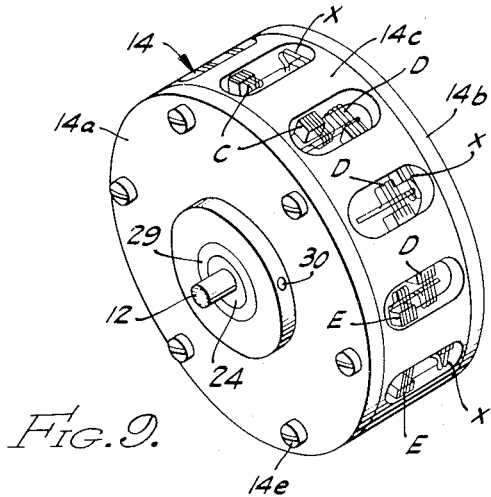

Figure 9 is a perspective view showing a control illustrated in schematic form in Figure 1.

Figure 10:
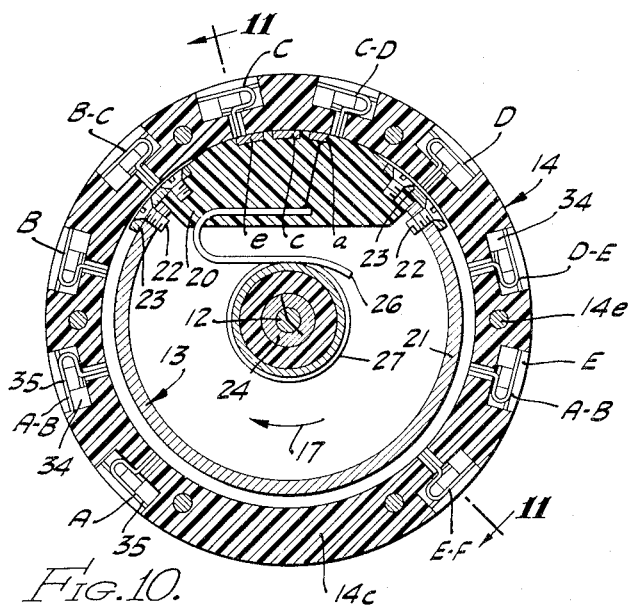

Figure 10 is a longitudinal sectional view through the control shown in Figure 9.

Figure 11:
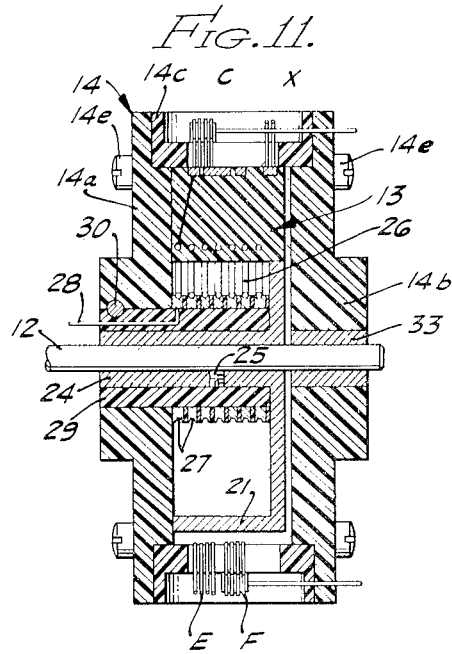

Figure 11 is a sectional view taken substantially on the line of 11—11 of Figure 10.

Figure 12:
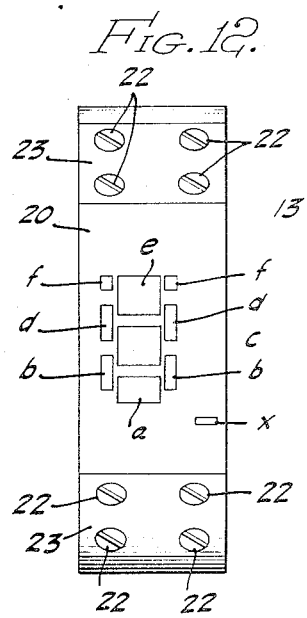

Figure 12 serves to illustrate the contact arrangement on the inner rotatable rotor of the control shown in Figure 9.

Figure 13:
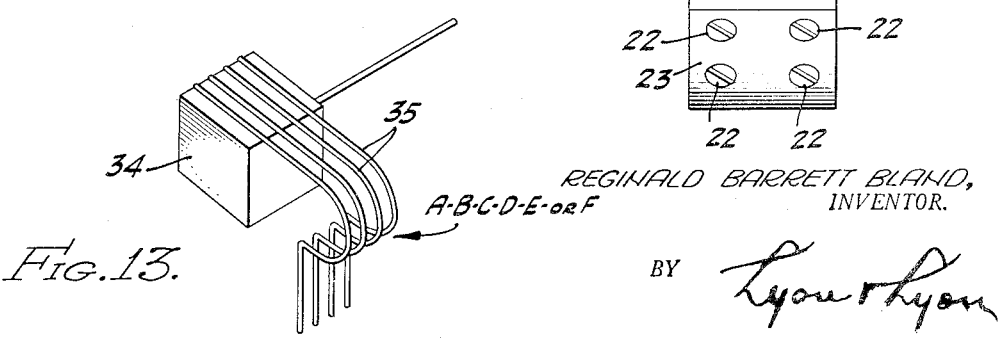

Figure 13 is a perspective view showing the character of the brushes mounted in the stator of the control for cooperation with the contacts in the rotor illustrated in Figure 12.

Figure 14:
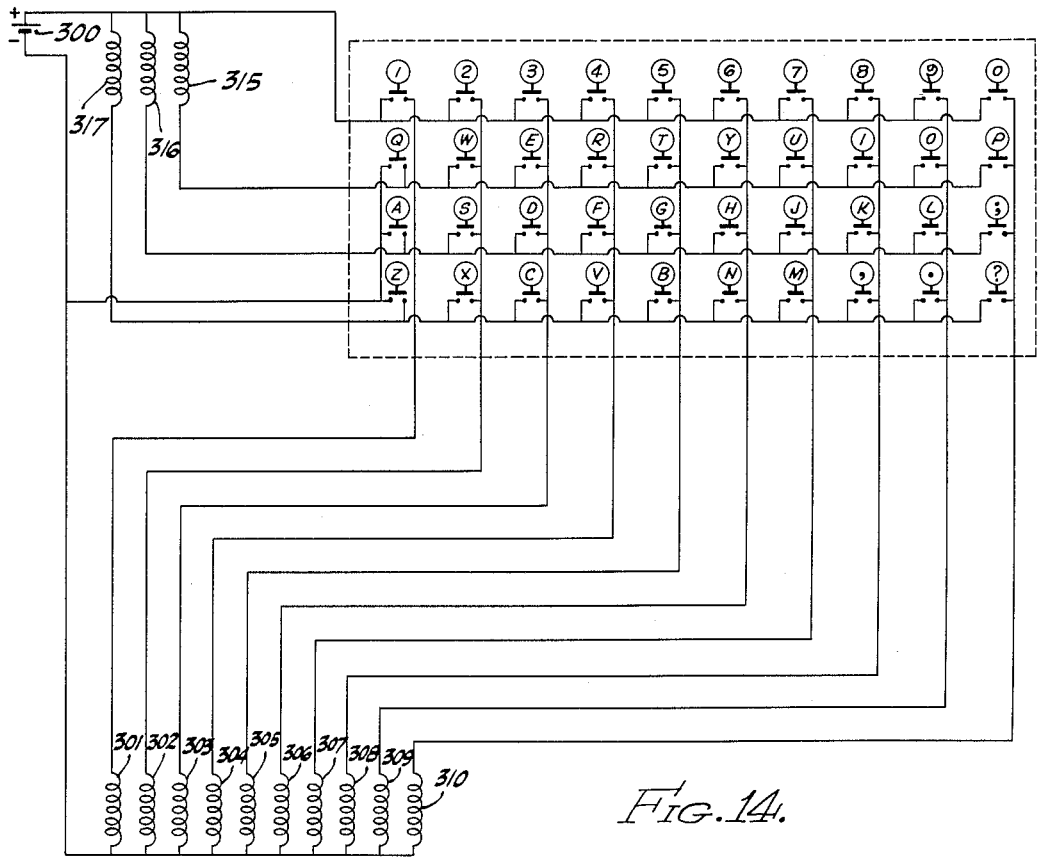

Figure 14 illustrates the manner in which the solenoid actuated mechanism of the character shown in Figure 2 may be connected for purposes of transmitting information of the character transmitted by present-day Teletype systems.

Figure 16:
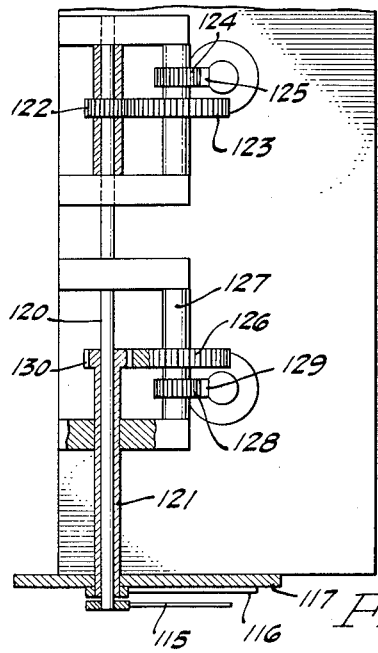
Figure 15:
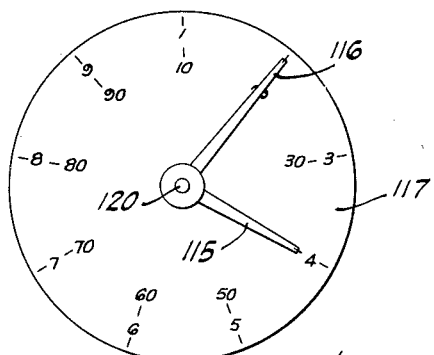

Figures 15 and 16 relate to a modified structure for producing indications on a dial instead of two counter wheels as illustrated in Figure 2.

The apparatus described herein functions to produce a visible indication by means of the cooperating tens and units wheels 10, 11 in Figure 2, such wheels 10, 11 being moved to different positions in accordance with the adjusted position of the manually operated shaft 12 in Figure 11. These counter wheels 10, 11 indicate numbers from 0 to 99 continuously, when and as the shaft 12 is rotated through an angular distance somewhat less than 360°. The rotor shaft 12 mounts the rotor unit 13, illustrated in Figure 12, and which carries the insulated contacts $a$, $b$, $c$, $d$, $e$, and $f$, as well as an insulated so-called $x$ contact. These contacts $a$, $b$, $c$, $d$, $e$, $f$, and $x$ are interconnected, as illustrated in Figure 1, with other apparatus and cooperate with relatively stationary contacts on the stator 14, such stationary contacts comprising a series of contacts designated as A, B, C, D, E, F and X. The contacts on the rotor 13 are termed herein as the unit contacts while the contacts on the stator 14 are referred to herein as the tens contacts.

As is evident from the following description, the rotor contact $a$ represents the numeral 0; the contacts $a$, $b$, considered jointly, represent the numeral 1; the rotor contact $b$ represents the numeral 2; the rotor contacts $b$, $c$, considered jointly, represent the numeral 3; the contact $c$ represents the numeral 4; the contacts $c$, $d$, considered jointly, represent the numeral 5; the contact $d$ represents the numeral 6; the contacts $d$, $e$, considered jointly, represent the numeral 7; the contact $e$ represents the numeral 8; and the contacts $e$, $f$, considered jointly, represent the numeral 9. On the other hand, the stator contact A represents the numeral 00; the stator contacts A, B, considered jointly, represent the numeral 10; the stator contact B represents the numeral 20; the stator contacts B, C, considered jointly, represent the numeral 30; the stator contact C represents the numeral 40; the stator contacts C, D, considered jointly, represent the numeral 50; the stator contact D represents the numeral 60; the stator contacts D, E, considered jointly, represent the numeral 70; the stator contact E represents the numeral 80; and the stator contacts E, F, considered jointly, represent the numeral 90.

In Figures 1 and 10 the various stator contacts are spaced transversely on the stator with the various rotor contacts subtending an angular distance somewhat less than the angular spacing of the stator contacts. Thus, for example, all of the rotor contacts a, b, c, d, e, and f cooperate first with the stationary stator contact A before any one of such rotor contacts engage the adjacently disposed group of stator contacts A, B. It is noted in Figure 10, that the group of rotor contacts are disposed between the stator contacts C on the one hand and C, D on the other hand so that the mechanism in that position is effective to transmit the number 49, it being observed that the stator contacts C, D represent the number 50 and the stator contact C represents the number 40 and that the rotor contacts are in the position in Figure 10 where they are just about to leave the C contact upon rotation of the rotor in the direction indicated by the arrow 17 in Figure 10. Figure 1 represents the condition wherein the rotor moves an incremental distance from the position represented in Figure 10 and in such case the rotor contacts e and f are no longer engaged by the stator contact C and the rotor contact a contacts the stator contacts C and D to produce the next highest reading, namely 50, in the manner described hereinafter.

Various means may be used for mounting the different rotor and stator contacts in their relative positions, as shown, and for extending leads therefrom. The various rotor contacts a, b, c, d, e, f, and x are recessed in the block of insulating material 20 and formed as continuation of the annular metal flange 21 (Figs. 10, 11) to which the block 20 is fastened by means of screws 22 and straps 23. The annular flange 21 comprises essentially the rim of a wheel having integrally formed hub 24 which, as shown in Figure 11, is fastened by means of set screw 25 to the shaft 12. Also recessed in the block of insulating material 20, which is in the form of a sector, are seven separately insulated wire brushes 26. These wire brushes 26 are supported as cantilevers as shown in Figure 10 and are resilient so that they are pressed into engagement with corresponding metal slip rings 27 (Fig. 11), such slip rings 27 being insulated from one another for being connected to different leads 28 which extend outwardly of the control unit for connection to the external circuitry illustrated in Figure 1. These insulated slip rings 27 are stationarily mounted on the annular insulated bushing 29, which is keyed by means of key 30 to the stationary casing or stator 14. The stator 14 comprises a pair of circular end plates 14a, 14b spaced by the annular dished ring 14c. These three elements, i. e., 14a, 14b, and 14c are secured as a unit by means of bolts 14e and are provided with the aligned bushings 24 and 33 for rotatably supporting the rotatable shaft 12. The various stator contacts A, B, C, D, E, F and X are of the general form indicated in Figure 13 and are supported on a block of insulating material 34 (Fig. 13) which in turn may be cemented to the annular ring 14c with the ends of the spring wire contacts 35 projecting through the ring 14c for resilient engagement with the rotor contacts a, b, c, d, e, f and x, as the case may be. These spring contacts 35 are interconnected in the manner illustrated in Figure 1. As a matter of fact, in the practical embodiment of the arrangement herein, as illustrated in Figure 11, four of such wire contacts 35 comprise one of the A, B, C, D, E, F contacts as the case may be, whereas the X contact comprises only two of such spring wires 35, as indicated in Figure 11.

Now that the physical arrangement of rotor and stator contacts and their relationship have been described, a detailed description of the solenoid actuated mechanisms to which such contacts are connected are now described.

There are provided two groups of solenoid actuated mechanisms, one group corresponding to "tens" solenoids and having the reference numerals A, B, C, D, E, F, while the other group is termed herein as "units" solenoids and have the reference numerals a, b, c, d, e, and f. Both groups, i. e., the tens and units groups, are of identical construction and for that reason a detailed description of the tens solenoids A, B, C, D, E, F, suffices as a description of the units group. Referring to Figures 2, 3, 4, 5, 6 and 7, the solenoid actuated mechanisms A, B, C, D, E, F, serve generally to rotate the counter wheel 10 a predetermined angular distance depending upon the particular mechanism or group of mechanisms energized. The counter or printing wheel 10 is mounted on the shaft 40 which is rotatably supported in the spaced bearings 41, 42 on the stationary frame 43. The shaft 40 carries a pinion gear 44 which is in constant mesh with the vertically movable rack 45. The rack 45 is mounted on the upper end of a rod 46 to which is keyed the circular plate 47. The rod 46 is slidably mounted in the guide sleeve 48 which in turn is affixed to the horizontal stationary frame member 49. In order to assure constant engagement between the pinion gear and the rack 45 so as to avoid back lash, a torque spring 50 (Fig. 3) is provided. This torque spring 50 has its lower end attached to the stationary frame 43 and the other one of its ends attached to the rotatably supported shaft 51, which carries the gear 53, such gear 53 being in constant mesh with the larger gear 54 mounted on shaft 40.

The actuating plate 47 and hence the rack 45 is normally urged downwardly by the tension spring 55 (Fig. 2) which has one of its ends affixed to the lower stationary frame member 49 and the other one of its ends affixed to the hub on the actuating plate 47. This circular actuating plate 47 may be moved upwardly different vertical distances depending upon which one of the solenoids A, B, C, D, E, F or group of the same is energized. For this purpose, the limitations of travel of the armatures of these solenoid actuated mechanisms are established so that the counter or printing wheel 10 reads 0 when the mechanism a is energized, the wheel 10 reads numeral 1 when the mechanisms a, b are both energized; the wheel 10 reads the numeral 2 when the mechanism b only is energized, etc. For this purpose, the armatures of the mechanisms b, c, d, e and f are mechanically interlocked in a manner described in detail later.

Each of the solenoids of the solenoid actuated mechanisms is constructed as shown in section in Figure 5 wherein the solenoid winding 60 is stationarily mounted on the frame member 49 and has a cooperating armature 62 to which is attached the plunger 63, such plunger being slidably mounted in the bushing 64. The upper end of the plunger 63 is recessed within the vertically movable sleeve 66. Such sleeve is slidably mounted within the cylinder 65. The cylinder 65 is adjustably secured by means of set screw 67 to the rod 69, which passes through aligned apertured portions in the actuating plate 47 and frame member 70. The rod 69 has a recessed portion 71 through which a motion limiting pin 72 passes, such pin 72 being affixed to the sleeve 66. The upper end of the rod 69 is engaged by the lower end of the coil compression spring 75 which has its upper end recessed in the frame member 43. The rod 69 also has adjustably mounted thereon the collar 76 maintained in position by set screw 77. Upon energization of the winding 60, the plate 47 is thus raised an amount which is permitted by means described in detail later. Such motion limiting means in general comprises pivoted levers 68 (Figs. 5, 6 and 7) which serve to interlock adjacent solenoid actuated mechanisms. It is observed that the solenoid actuated mechanism A is not thus limited since it is not mechanically interlocked, but in such case the upward movement of the rod 69 for the mechanism A is limited by engagement of the armature 62 with the lower end of the bushing 64 (Fig. 5). The interlocking plate 68 is interlocked on upstanding standards 80 fixed at their lower ends to the frame member 49. These plates 68 are pivoted at a point intermediate its ends and have oppositely extending portions which partially encircle on the one hand the tubular sleeve 66 and on the other hand the cylinder 65 of the adjacent mechanism. Thus one end of the pivoted plate 68 is adapted to be engaged by the lower flange 66a on sleeve 66 while the other end of the lever 68 is adapted to be engaged by the flange 65a on the cylinder 65. When, as shown in Figure 6, the mechanism B is energized the actuating plate 47 is moved upwardly a distance limited by the lefthand end of lever 68. Thereafter, when the mechanism C is energized the plate 47 is raised an additional amount determined by the position which the lever 68 assumes at that time, it being noted that since both mechanisms B and C are energized (Fig. 7) the plate 47, while moved up an additional distance, may be moved still further upon subsequent deenergization of the mechanism B. Such step by step upward movement of the plate 47 results in rotation of the counter wheel 10 (Fig. 2).

Similarly, provisions are made for energizing the mechanisms D, E, and F either singly or jointly with the mechanism having the next succeeding letter so as to rotate the counter wheel 10 to a correspondingly designated position. The same is true in the units mechanism which includes the mechanisms a, b, c, d, e and f.

The solenoid coils for mechanisms A, B, C, D, E and F and a, b, c, d, e, and f are connected to the aforementioned contacts in the manner illustrated in Figure 1.

In Figure 1 one terminal of coils A, B, C, D, E and F is connected to the positive terminal of voltage source 100. Similarly, one terminal of each of the coils a, b, c, d, e and f is connected to the negative terminal of source 100. The other terminals of coils A, B, C, D, E and F are connected respectively to the A, B, C, D, E and F contacts. Likewise, the other terminals of coils a, b, c, d, e and f are connected to contacts a, b, c, d, e and f. In order to assure correct operation, the X and x contacts are provided. The X contacts are connected through the winding of relay 101 to the positive terminal of source 100. The x contact is connected to the negative terminal of source 100. The winding of relay 102 is connected between the negative terminal of source 100 and the a terminal. The normally closed switch 101A of relay 101 has its movable contact connected to the normally open contacts 104, 105 of relay 102. The fixed contact of switch 101A is connected to the negative terminal of source 100 through resistance 106. The movable switch elements 107, 108 serve normally to interconnect one terminal of coils f and e to corresponding contacts f and e. In other words, these connections are made to coils e and f only when relay 102 is deenergized, i. e., so long as the winding a is deenergized. Upon energization of relay 102, the current which would otherwise flow through windings e and f flows through the compensating resistance 106, provided, of course, that the relay 101 remains deenergized. The winding of relay 101 has one of its terminals connected to the positive terminal of source 100 and the other one of its terminals connected to the X contacts so that relay 101 is energized whenever the rotor x contact engages any one of the X contacts. In this respect it is observed also that the x contact leads the a contact so that relay 101 becomes energized prior to energization of winding a for purposes described presently.

Once the apparatus is indexed, i. e., the wheels 10, 11 assume a stationary position which is representative of the angular position of the rotor shaft 12, a record may be made of the indication thus provided by the wheels 10, 11 by closing the switch 110 in Figure 1. In such case, the solenoid 111 is energized to produce movement of the printing roll 112 into engagement with the raised numerals on the wheels 10, 11 (Fig. 2) for purposes of recording same. It is noted that the switch 110 and solenoid 111 are serially connected with the voltage source 100.

Referring to Figure 1, the rotor contact a is in engagement with the stator contacts C and D to indicate, by the simultaneous energization of the coils D and C, the numeral 50. It is observed at this time that the winding or coil a is also energized; and also the relay winding 102 is energized to operate the associated relay switches 107 and 108 to thereby assure disabling of circuitry used in energizing, under certain conditions, the solenoids e and f. This expedient assures the absence of a false reading of 59 under conditions when, either due to mechanical misalignment or wear or other causes, there may possibly be the situation wherein there is simultaneous engagement, on the one hand between the rotor contact a with the stator contacts C and D, and on the other hand between rotor contacts e and f with stator contact C. Under this particular situation, the switching resulting from rotor contacts e and f being in engagement with the stator contact C does not cause the energization of the coils e and f (indicating the digit 9) because of actuation of the relay switches 107 and 108 disabling the circuitry extending to the solenoids or coils e and f.

The likelihood of false readings is likewise prevented due to the use of the rotor x contact and cooperating X stator contact at the time of transition from 19 to 20, from 39 to 40, from 59 to 60, from 79 to 80 and from 99 to 00, namely at the time of transition from engagement of the rotor with a double stator contact to engagement of such rotor with a single stator contact. Thus, assuming the rotor is in engagement with the pair of stator contacts C and D and moves in the direction of the single D stator contact, then, to prevent false readings occasioned otherwise due to lack of mechanical alignment, wear and other similar reasons, the rotor x contact, which leads the rotor a contact, engages the stator X contact immediately before the rotor a contact engages the stator contact D. In this exact position, the relay winding 101 is energized to thereby open relay switch 101A. Immediately thereafter, when the rotor a contact engages the single D stator contact, the units coil or solenoid a is energized to indicate the digit 0; and, relay 102 is operated to disable the circuit extending to the units coils e and f to thereby prevent a false reading of 9 in the event that the e and f rotor contacts, due to misalignment or other causes, is still in engagement with the pair of stator contacts C and D when the rotor a contact is in engagement with the single stator contact D. Further, since the rotor x contact is in engagement with the stator X contact, the C solenoid is prevented from being energized since in such case the relay switch 101A is open. Thus, at the time the a rotor contact engages the single D contact, a reading of 60 is assured, i. e., only the coil D and the coil a are energized.

Figures 15 and 16 serve to show means whereby indications otherwise produced using two wheels 10, 11 in Figure 2 may be displaced by a pair of rotating pointers 115, 116 which rotate about the same axis for cooperation with indicia on the dial face 117. For this purpose, the pointer 115 is mounted on the inner shaft 120 which extends through the sleeve 121 and which mounts the gear 122. The gear 122 is in mesh with driving gear 123. The gear 123 is mounted on the same rotatable shaft as the gear 124 which cooperates with a vertically movable rack bar 125, such rack bar 125 being attached to the actuating plate 47 in Figure 2. Thus the pointer 115 indicates the tens while the pointer 116 is coupled in similar manner to indicate the units. The pointer 111 is mounted on the rotatable sleeve 121, such sleeve 121 carrying the gear 130 which is in mesh with the large gear 126. The gear 126 is mounted on a common shaft 127 with the gear 128. The gear 128 is for engagement with the rack 129 which is affixed to the actuating plate 47 of the units mechanism.

In the modified arrangement shown in Figure 14 the various characters on the keyboard of a conventional typewriter are associated with normally open switches and such switches may be considered to have the correspondingly designated reference characters, i. e., 1, 2, 3, 4, 5, 6, 7, 8, 9, 0, Q, W, E, R, etc., as shown in Figure 14. These switches may be considered as being divided into four series or layers. The first layer of switches, i. e., 1, 2, 3, 4, 5, 6, 7, 8, 9, 0, each have one of their terminals connected to the positive terminals of voltage source 300. The other terminals of such switches are connected respectively to one terminal of solenoid coils 301, 302, 303, 304, 305, 306, 307, 308, 309, and 310, with the common lead of each of such coils being returned to the negative terminal of voltage source 300. These coils 301-310, both inclusive, may be considered to be an assembly of coils as represented by the coils A, B, C, D, E, and F in Figure 4 with, of course, mechanical interlocking between the actuating mechanisms as described. The second layer or deck of switches Q, W, E, R, T, Y, U, I, O and P each have one of their terminals connected through the solenoid coil 315 to the positive terminal of source 300, the other terminal of switches Q being returned to the negative terminal of source 300, whereas the other terminals of switches W, E, R, T, Y, U, I, O and P are connected to terminals of coils 302, 303, 304, 305, 306, 307, 308, 309, 310 respectively. In similar manner the third layer or deck of switches A, S, D, F, G, H, J, K, L, ;, have one of their terminals connected through solenoid coil 316 to the positive terminal of source 300, the other terminal of switch A being connected to the negative source of 300, whereas the other terminals of switches S, D, F, G, H, J, K, L and ;, are connected respectively to one terminal of coils 302, 303, 304, 305, 306, 307, 308, 310; similarly, the fourth layer or deck of switches each have one of their terminals connected through solenoid coil 317 to the positive terminal of voltage source 300, the other terminal of the switch Z being connected directly to the negative terminal of source 300, whereas the other terminals of switches X, C, V, B, N, M, comma and question mark are connected respectively to coils 302, 303, 304, 305, 306, 307, 308, 309, 310. Whereas, as mentioned before, the coils 301-310, both inclusive, may be assembled as shown in Figure 4, with their actuating mechanisms interlocked, the solenoid coils 315, 316, 317 may likewise be interlocked and correspond with the other set of coils illustrated in Figure 2. In other words, the solenoid actuated mechanisms which include the coils 301-310, both inclusive, move the tens wheel 10 (Figure 2) to different adjusted positions depending upon which one of such coils is energized, whereas the coils 315, 316, 317 effects movement of the units wheel 11 to correspondingly different adjusted positions. By this means the forty characters illustrated in Figure 14 correspond to one of forty different numbers which is indicated by the cooperating tens and units wheels 10 and 11.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, a plurality of solenoid actuated mechanisms representing tens, a plurality of solenoid actuated mechanisms representing units, switching means including a positionable element, means including said positionable element for energizing selected ones of each of said mechanisms in accordance with the position of said element said last-mentioned means including means on said positionable element for preventing simultaneous energization of one of said mechanisms representing tens and one of said mechanisms representing units, at a predetermined position of said positionable element, to thereby assure correct indications in all positions of said positionable element.

2. In an arrangement of the character described, a plurality of mechanisms representing tens, a plurality of mechanisms representing units, means energizating each of said mechanisms, said means including a stator and a rotor and incorporating means whereby selected ones of each of said mechanisms is energized in accordance with angular positions of said rotor said last-mentioned means including means on said rotor for preventing simultaneous energization of one of said mechanisms representing tens and one of said mechanisms representing units at a predetermined position of said rotor to thereby assure correct indications in all positions of said rotor.

3. In an arrangement of the character described, a relatively fixed member having mounted thereon: a plurality of successive series of contacts with each successive series being staggered with reference to the preceding series and with one contact in succeeding and preceding series overlapping, each of said contacts being spaced a relatively large distance and representing a relatively large denomination; a relatively movable member having mounted therein: a second series of spaced contacts, a third series of contacts disposed on opposite sides of said second series and bridging the spacing between contacts of said second series, the overall spacing of said second and third series being commensurate with the spacing of contacts on said relatively fixed member, a first series of mechanisms connected to corresponding contacts of the same series on said relatively fixed member, a second and third series of mechanisms connected respectively to corresponding contacts of said second and third series of contacts, and indicating means actuated by said mechanisms.

4. The arrangement set forth in claim 3 in which mechanisms of said first series and mechanisms of said second series each incorporate interlocking means for controlling the position of said indicating means.

5. The arrangement set forth in claim 4 in which both said relatively movable member and relatively fixed member have cooperating auxiliary contacts with associated means for rendering certain of said mechanisms ineffective.

6. The arrangement set forth in claim 5 in which said auxiliary contact on the relatively stationary member lies intermediate each series of said plurality of series of contacts and the cooperating contact on said relatively movable member precedes the first of said second series of contacts.

7. In an arrangement of the character described, a relatively fixed member having mounted thereon a plurality of successive series of contacts with each successive series being staggered with reference to the preceding series and with one contact in succeeding and preceding series overlapping, each of said contacts being spaced a relatively large distance and representing a relatively large denomination; a relatively movable member having mounted thereon: a second series of spaced contacts, a third series of contacts disposed on opposite sides of said second series and bridging the spacing between contacts of said second series, the overall spacing of said second and third series being commensurate with the spacing of contacts on said relatively fixed member, indicating means, and step by step means connected to said contacts on said relatively fixed and relatively movable members for actuating said indicating means in accordance with the relative position of said fixed and movable members.

8. In an arrangement of the character described, a first series of contacts, first translating means connected to said first series of contacts, a second series of contacts, second translating means connected to said second series of contacts, first brush means engageable with said first series of contacts and serving to energize said first translating means, second brush means engageable with said second series of contacts for energizing said second translating means, means for moving said first and second brush means jointly, and means automatically operative when said first brush means engages a selected contact of said first series of contacts for preventing said second translating means from being energized by said second brush means.

9. In an arrangment of the character described, a first series of contacts, first translating means energized by said first series of contacts, a second series of contacts, second translating means energized by said second series of contacts, first brush means associated with said first series of contacts, second brush means associated with said second series of contacts, means moving said first and second brush means jointly, means automatically effective when said first brush means engages a selected one of said first series of contacts for preventing said second brush means from energizing said second translating means, and means automatically effective when said first brush means disengages said selected one of said first series of contacts for allowing said second brush means to energize said second translating means.

References Cited in the file of this patent

UNITED STATES PATENTS

| | | |
|---|---|---|
| 455,268 | Wiesebrock | June 30, 1891 |
| 720,076 | Sheehy | Feb. 10, 1903 |
| 1,139,972 | Henschel et al. | May 18, 1915 |
| 1,627,168 | Ford | May 3, 1927 |
| 2,192,421 | Wallace | Mar. 5, 1940 |
| 2,495,416 | McCauley | Jan. 24, 1950 |
| 2,496,585 | Harper | Feb. 7, 1950 |
| 2,620,981 | Benson et al. | Dec. 9, 1952 |
| 2,666,912 | Gow et al. | Jan. 19, 1954 |

FOREIGN PATENTS

| | | |
|---|---|---|
| 74,170 | Norway | Oct. 25, 1948 |
| 18,428 | Great Britain | Aug. 8, 1907 |